United States Patent
Koo et al.

(10) Patent No.: US 8,964,656 B2
(45) Date of Patent: Feb. 24, 2015

(54) METHOD OF TRANSMITTING CHANNEL STATE INFORMATION IN WIRELESS COMMUNICATION SYSTEM

(75) Inventors: Ja Ho Koo, Gyeonggi-do (KR); Hyun Soo Ko, Gyeonggi-do (KR); Bin Chul Ihm, Gyeonggi-do (KR); Wook Bong Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 744 days.

(21) Appl. No.: 12/753,475

(22) Filed: Apr. 2, 2010

(65) Prior Publication Data

US 2010/0254335 A1  Oct. 7, 2010

Related U.S. Application Data

(60) Provisional application No. 61/165,914, filed on Apr. 2, 2009, provisional application No. 61/168,233, filed on Apr. 10, 2009.

(30) Foreign Application Priority Data

Dec. 9, 2009 (KR) .......................... 10-2009-0121785

(51) Int. Cl.
*H04W 4/00* (2009.01)
*H04W 48/08* (2009.01)
*H04W 28/04* (2009.01)
*H04W 72/04* (2009.01)

(52) U.S. Cl.
CPC .............. *H04W 48/08* (2013.01); *H04W 28/04* (2013.01); *H04W 72/042* (2013.01)
USPC ............................ 370/329; 370/252; 370/338

(58) Field of Classification Search
USPC ........................................................ 370/329
See application file for complete search history.

(56) References Cited

U.S. PATENT DOCUMENTS

| | | | |
|---|---|---|---|
| 6,980,527 B1* | 12/2005 | Liu et al. ......................... | 370/280 |
| 7,982,670 B2* | 7/2011 | Mestre Pons .................. | 342/417 |
| 2006/0121946 A1* | 6/2006 | Walton et al. ................. | 455/561 |
| 2006/0234646 A1* | 10/2006 | Naguib et al. .................. | 455/69 |
| 2006/0268676 A1* | 11/2006 | Gore et al. ..................... | 370/210 |
| 2007/0054633 A1* | 3/2007 | Piirainen ..................... | 455/115.3 |
| 2007/0177681 A1* | 8/2007 | Choi et al. ..................... | 375/260 |
| 2007/0218950 A1* | 9/2007 | Codreanu et al. .......... | 455/562.1 |
| 2008/0291851 A1* | 11/2008 | Guthy et al. .................. | 370/329 |
| 2009/0080560 A1* | 3/2009 | Na et al. ........................ | 375/267 |
| 2009/0110114 A1* | 4/2009 | Onggosanusi et al. ....... | 375/299 |
| 2009/0122884 A1* | 5/2009 | Vook et al. ..................... | 375/260 |
| 2009/0154588 A1* | 6/2009 | Chen et al. ..................... | 375/267 |

(Continued)

*Primary Examiner* — Ian N Moore
*Assistant Examiner* — Jenee Williams
(74) *Attorney, Agent, or Firm* — Morgan, Lewis & Bockius LLP

(57) ABSTRACT

A method of transmitting channel state information from a user equipment in a wireless communication system is disclosed. In order to report the channel state information, the user equipment is able to additionally transmit noise plus interference variance information as well as spatial channel matrix or spatial channel covariance matrix. The spatial channel matrix or spatial channel covariance matrix and the noise plus interference variance information can include information on a prescribed number of subbands in best channel states and can include information on a wideband including a plurality of subbands. Moreover, the user equipment is able to transmit normalized spatial channel matrix or spatial channel covariance matrix and normalized noise plus interference variance information for accurate and efficient transmission of the channel state information.

8 Claims, 8 Drawing Sheets

(56) References Cited

U.S. PATENT DOCUMENTS

| | | |
|---|---|---|
| 2009/0168718 A1* | 7/2009 | Wang et al. .................... 370/330 |
| 2009/0286482 A1* | 11/2009 | Gorokhov et al. ............ 455/63.1 |
| 2009/0286562 A1* | 11/2009 | Gorokhov ..................... 455/501 |
| 2010/0002598 A1* | 1/2010 | Pan et al. ....................... 370/252 |
| 2010/0056215 A1* | 3/2010 | Gorokhov et al. ............ 455/561 |
| 2010/0099428 A1* | 4/2010 | Bhushan et al. ............ 455/452.1 |
| 2010/0103834 A1* | 4/2010 | Gorokhov et al. ............ 370/252 |
| 2010/0177746 A1* | 7/2010 | Gorokhov et al. ............ 370/329 |
| 2010/0189038 A1* | 7/2010 | Chen et al. .................... 370/328 |
| 2010/0195586 A1* | 8/2010 | Choi et al. ..................... 370/329 |
| 2010/0202311 A1* | 8/2010 | Lunttila et al. ................ 370/252 |
| 2010/0238984 A1* | 9/2010 | Sayana et al. ................. 375/219 |
| 2010/0246705 A1* | 9/2010 | Shin et al. ..................... 375/267 |
| 2010/0260234 A1* | 10/2010 | Thomas et al. ............... 375/141 |
| 2011/0032895 A1* | 2/2011 | Englund et al. ............... 370/329 |
| 2011/0237270 A1* | 9/2011 | Noh et al. ..................... 455/450 |

* cited by examiner

METHOD OF TRANSMITTING CHANNEL STATE INFORMATION IN WIRELESS COMMUNICATION SYSTEM

Pursuant to 35 U.S.C §119 (e), this application claims the benefit of earlier filing date and right of priority to provisional Application No. 61/165,914, filed on Apr. 2, 2009, provisional Application No. 61/168,233, filed on Apr. 10, 2009, and the Korean Patent Application No. 10-2009-0121785, filed on Dec. 9, 2009, the contents of which are incorporated by reference herein in their entirety.

BACKGROUND OF THE INVENTION

1. Field of the Invention

The present invention relates to a wireless communication system, and more particularly, to a method of transmitting channel state information in a wireless communication system.

2. Discussion of the Related Art

Generally, a coordinated multi-point (CoMP) system (hereinafter abbreviated CoMP system) is the system to improve throughput of a user located on a cell boundary by applying enhanced MIMO transmission in a multi-cell environment. If the CoMP system is applied, it is able to reduce inter-cell interference in the multi-call environment. If the CoMP system is used, a user equipment can be supported with data from multi-cell base stations jointly.

And, each base station is able to enhance system performance by supporting at least one or more user equipments UE 1, UE 2, . . . , UE K simultaneously using the same radio frequency resource. Moreover, a base station is able to perform space division multiple access (SDMA) based on channel state information (CSI) between the base station and a user equipment.

The CoMP scheme can be categorized into a coordinated MIMO (CoOMIMO) type joint processing (JP) scheme through data sharing and a coordinated scheduling scheme/beamforming scheme (CS/CB).

FIG. 1 is a conceptional diagram for CoMP (coordinated multi-point) of an intra base station (intra eNB) and an inter base station (inter eNB) according to a related art.

Referring to FIG. 1, intra base stations 110 and 120 and an inter base station 130 exist in a multi-cell environment. In LTE (long term evolution) system, an intra eNB is constructed with several cells or sectors. Cells belonging to a base station, to which a specific user equipment belongs, lie in relation between the specific user equipment and the intra base stations 110 and 120. Namely, in case of sharing the same base station to which a user equipment belongs, the corresponding cells are the cells corresponding to the intra base stations 110 and 120. And, other cells belonging to other base stations becomes the cells corresponding to the inter base station 130. Thus, the cells, which are based on the same base station for a specific user equipment, exchange information (e.g., data, channel station information (CSI), etc.) with each other through x2 interfaces and the like. Yet, the cells, which are based on other base stations, can exchange inter-cell information with each other through a backhaul 140 and the like.

Referring to FIG. 1, a single cell MIMO user 150 in a single cell communicated with a single serving base station in one cell or sector. And, a multi cell MIMO user 160 located on a cell boundary is able to communicate with a plurality of serving base stations in multi cell or sector.

In the following description, spatial channel matrix usable for the present invention shall be schematically explained.

$$H(i,k) = \begin{bmatrix} h_{1,1}(i,k) & h_{1,2}(i,k) & \ldots & h_{1,Nt}(i,k) \\ h_{2,1}(i,k) & h_{2,2}(i,k) & \ldots & h_{2,Nt}(i,k) \\ \vdots & \vdots & \ddots & \vdots \\ h_{Nr,1}(i,k) & h_{Nr,2}(i,k) & \ldots & h_{Nr,Nt}(i,k) \end{bmatrix}$$

In this matrix, the H(i,k) is a spatial channel matrix, the Nr indicates the number of receiving antennas, the Nt indicates the number of transmitting antennas, the r indicates an index of a receiving antenna, the t indicates an index of a transmitting antenna, the i indicates an index of an OFDM or SC-FDMA symbol, and the k indicates an index of a subcarrier.

The $h_{r,t}(i,k)$ is an element of the channel matrix H(i,k) and means an $r^{th}$ channel state and a $t^{th}$ antenna on an $i^{th}$ symbol and a $k^{th}$ subcarrier.

Spatial channel covariance matrix usable for the present invention is schematically explained as follows. The spatial channel covariance matrix can be represented as a symbol R.

$$R = E[H_{i,k} H_{i,k}^H]$$

In this matrix, the H indicates a spatial channel matrix and the R indicates a spatial channel covariance matrix. The E[ ] means an average, the i indicates a symbol index, and the k indicates a frequency index.

Singular value decomposition (SVD) is one of major methods for decomposing a rectangular matrix and is the scheme frequently used in the fields of signal processing and statistics. The SVD is generated from generalizing the spectrum theory of matrix for an arbitrary rectangular matrix. In case of using the spectrum theory, it is able to decompose an orthogonal square matrix into diagonal matrixes on the base of an eigen value. Assume that a matrix H is an m×m matrix consisting of elements of a set of real or complex numbers. In this case, the matrix H can be represented as multiplications of 3 matrixes shown in the following.

$$H_{m \times m} = U_{m \times m} \Sigma_{m \times n} V_{n \times n}^H$$

In this case, the U and V indicate unitary matrixes, respectively. The $\Sigma$ indicates m×n diagonal matrix including a singular value that is not negative. The singular value is represented as $\Sigma = \text{diag}(\sigma_1 \ldots \sigma_r)$, $\sigma_i = \sqrt{\lambda_i}$. Thus, the representation of the multiplication of three matrixes is called singular value decomposition. The singular value decomposition can handle more general matrixes rather than the eigen value decomposition capable of decomposing an orthogonal square matrix only. And, the singular value decomposition and the eigen value decomposition are related to each other.

When a matrix H is a positive definite Hermitian matrix, all eigen values of the H are non-negative real numbers. In this case, a singular value and vector of the H become equal to an eigen value and vector of the H, respectively.

Meanwhile, the eigen value decomposition (EVD) can be represented as follows.

$$H^H H = (U \Sigma V^H)(U \Sigma V^H)^H = U \Sigma \Sigma^T U^H$$

$$H^H H = (U \Sigma V^H)^H (U \Sigma V^H) = V \Sigma^T \Sigma V$$

In this case, the eigen value can be set to $\lambda_1, \ldots, \lambda_r$.

SUMMARY OF THE INVENTION

Accordingly, the present invention is directed to a method of transmitting channel state information in a wireless communication system that substantially obviates one or more of the problems due to limitations and disadvantages of the related art.

An object of the present invention is to provide a method of transmitting channel state information in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting channel state information at a user equipment (UE) in a wireless communication system, the method includes the steps of receiving an uplink resource allocated for transmission of the channel state information from a base station (BS) and transmitting at least one of spatial channel matrix information and spatial channel covariance matrix information and noise plus interference variance information to the base station through the allocated resource.

In another aspect of the present invention, An user equipment (UE) for transmitting channel state information in a wireless communication system, the UE includes receiving module for receiving an uplink resource allocated for transmission of the channel state information from a base station (BS); and transmitting module for transmitting at least one of spatial channel matrix information and spatial channel covariance matrix information, and noise plus interference variance information to the base station through the allocated resource.

According to embodiments of the present invention, channel state information can be transmitted accurately and efficiently.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like and that a base station is a common name of such a random node of a network stage communicating with a terminal as a node B, eNode B, a base station and the like.

In a mobile communication system, a terminal is able to receive information in downlink from a base station and is also able to transmit information in uplink. The information received or transmitted by the terminal includes data and various kinds of control informations. And, various kinds of physical channels exist according to types and usages of the information transmitted or received by the terminal.

A terminology called a base station used for the present invention can be called a cell or sector in case of being used as a local concept. A serving base station (or a cell) may be regarded as a base station (or cell) that provides the conventional major services to a terminal and can perform transceiving of control information on coordinated multiple transmission point. In this meaning, a serving base station (or cell) can be named an anchor base station or an anchor cell.

Figure 1:
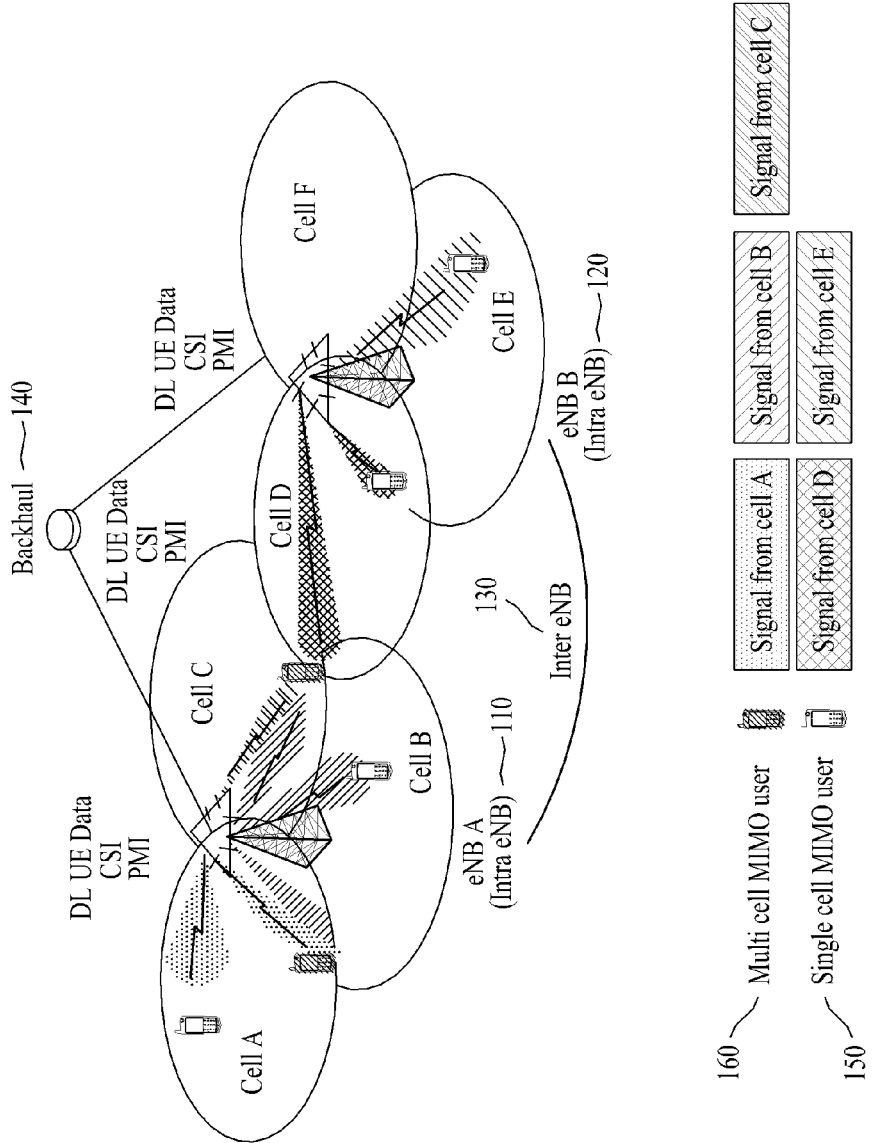
FIG. 1 is a conceptional diagram for CoMP (coordinated multi-point) of an intra base station (intra eNB) and an inter base station (inter eNB) according to a related art.
Figure 2:
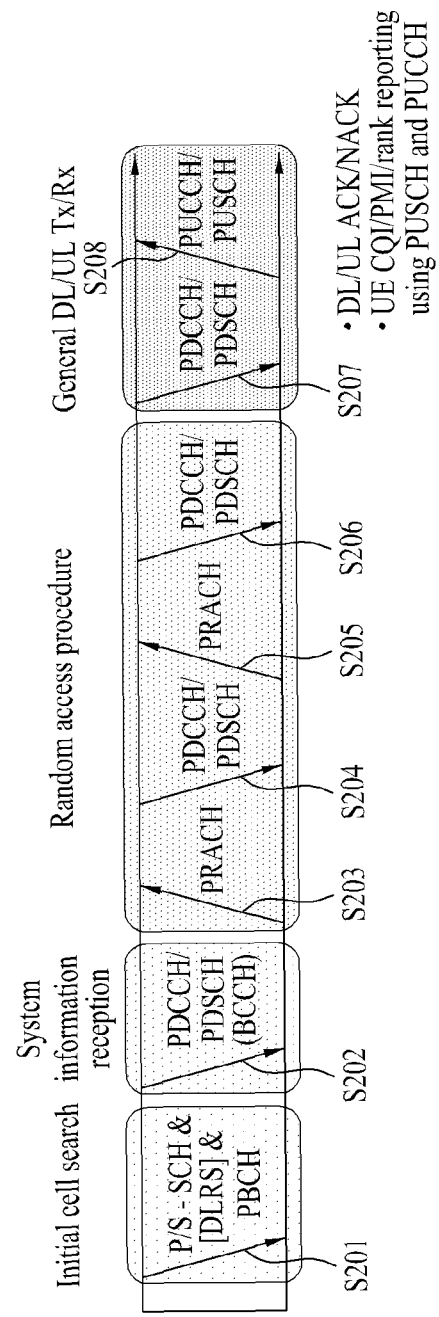
FIG. 2 is a diagram for explaining physical channels used for such a mobile communication system as 3GPP ($3^{rd}$ generation partnership project) LTE (long term evolution) system and a general signal transmitting method using the physical channels.

FIG. 2 illustrates physical channels used in a mobile communication system, for example, a 3rd Generation Partnership Project (3GPP) Long Term Evolution (LTE) system and a general signal transmission method using the physical channels.

Referring to FIG. 2, upon power-on or when a UE initially enters a cell, the UE performs an initial cell search involving synchronization of its timing to an eNB in step S201. For the initial cell search, the UE may be synchronized to the eNB and acquire information such as a cell Identifier (ID) by receiving a Primary Synchronization CHannel (P-SCH) and a Secondary Synchronization CHannel (S-SCH). Then the UE may receive broadcast information from the cell on a Physical Broadcast CHannel (PBCH). In the mean time, the UE may determine a downlink channel status by receiving a Down-Link Reference Signal (DL RS) during the initial cell search.

After the initial cell search, the UE may acquire more specific system information by receiving a Physical Downlink Control CHannel (PDCCH) and receiving a Physical Downlink Shared CHannel (PDSCH) based on information of the PDCCH in step S202.

On the other hand, if the UE had not access the eNB or if the UE does not have radio resource to transmit signals, it may perform a random access procedure to the eNB in steps S203 to 5206. For the random access, the UE may transmit a predetermined sequence as a preamble to the eNB on a Physical Random Access CHannel (PRACH) in step S203 and receive a response message for the random access on a PDCCH and a PDSCH corresponding to the PDCCH in step S204. In the case of contention-based random access other than handover, the UE may perform a contention resolution procedure by further transmitting the PRACH in step S205 and receiving a PDCCH and its related PDSCH in step S206.

After the foregoing procedure, the UE may receive a PDCCH and a PDSCH in step S207 and transmit a Physical Uplink Shared CHannel (PUSCH) and a Physical Uplink Control CHannel (PUCCH) in step S208, as a general downlink/uplink signal transmission procedure. Here, the control signal transmitted from UE to eNB and the control signal transmitted from UE to eNB comprise an ACK/NACK signal, a channel quality indicator (CQI), precoding matrix index (PMI) and/or a rank indicator (RI). The UE adapted to operate in the 3GPP LTE (3rd Generation Partnership Project Long Term Evolution) may transmit the control signal, such as CQI/PMI/RI though the PUSCH and/or the PUCCH.

A user equipment may report channel state information (hereinafter abbreviated CSI) and the recommended transmission properties (e.g., CQI (Channel Quality Indicator), PMI (Precoding Matrix Indicator), RI (Rank Indicator)) to a serving base station. In general, CSI feedback schemes are categorized into a quantization CSI feedback scheme and an analog CSI feedback scheme. Regardless of the types of the CSI feedback schemes, the CSI reported to the serving base station by the user equipment may include a spatial channel matrix H (hereinafter abbreviated 'channel matrix H', 'matrix H', etc.) or a spatial channel covariance matrix R (hereinafter abbreviated 'covariance matrix R', 'matrix R', etc.). In particular, the user equipment is able to transmit information of the spatial channel matrix H and/or the spatial channel covariance matrix R as the CSI feedback information to the serving base station. The user equipment is also able to additionally transmit an interference level (e.g., a noise variance) as well as the information of the spatial channel matrix H and/or the spatial channel covariance matrix R. Namely, the user equipment may transmit a noise plus interference variance to the serving base station together with the value of the spatial channel matrix H and/or the spatial channel covariance matrix R.

In the following description, various configurations of CSI feedback information, which will be transmitted to a serving base station by a user equipment, are explained.

First of all, according to a first embodiment of CSI feedback information transmission, assume that a user equipment reports 3 best subbands (i.e., M=3) having good channel states within a wideband to a serving base station. The user equipment assumes that the spatial channel matrix H corresponding to the 3 best subbands may include $H(1)$, $H(2)$ and $H(3)$ and that the spatial channel covariance matrix R corresponding to the 3 best subbands may include $R(1)$, $R(2)$ and $R(3)$. And, assume that an average spatial channel matrix and an average spatial channel covariance matrix of the best subband(s) are set to $H_{ave}$ and $R_{ave}$, respectively. Noise plus interference variances corresponding to the best subbands are $\sigma^2(1)$, $\sigma^2(2)$, ..., $\sigma^2(M)$, respectively. And, a noise plus interference variance of whole wideband is represented as $\sigma_w^2$. It is assumed that a channel matrix and a covariance matrix for wideband are set to $H_w$ and $R_w$, respectively. In this case, the wideband may include a whole bandwidth or some resources ((PRB (physical resource block) in 3GPP LTE or a partition of PRU (physical resource unit) in IEEE 802.16m system) of the whole bandwidth.

A user equipment may report channel matrix H and/or covariance matrix R of M best subbands, and noise plus interference variance value of whole bandwidth to a serving base station. In particular, the user equipment may transmit $H(1)$, $H(2)$, ..., $H(M)$ and/or $R(1)$, $R(2)$, ..., $R(M)$, and $\sigma_w^2$ value to the serving base station.

Meanwhile, according to a second embodiment of CSI feedback information transmission, a user equipment may report channel matrix H and/or channel covariance matrix R and M noise plus interference variance values for M best subbands to a serving base station. In case of using fractional frequency reuse (hereinafter abbreviated FFR) scheme, the user equipment can have a different interference level per subband or partition. In this case, the user equipment may report a noise plus interference value corresponding to each of the M best subbands which are currently used. In particular, the user equipment may report $H(1)$, $H(2)$, ..., $H(M)$ and/or $R(1)$, $R(2)$, ..., $R(M)$, and $\sigma^2(1)$, $\sigma^2(2)$, ..., $\sigma^2(M)$ values to the serving base station.

According to a third embodiment of CSI feedback information transmission, like the first embodiment of the present invention, a user equipment may report channel matrix H and/or covariance matrix R for M best subbands, and noise plus interference variance value of whole bandwidth to a serving base station. In addition to this, the user equipment may report transmit a single wideband H and/or R value for a wideband. In particular, the user equipment may transmit $H(1)$, $H(2)$, ..., $H(M)$ and/or $R(1)$, $R(2)$, ..., $R(M)$, $H_w$ and/or $R_w$, and $\sigma_w^2$ value to the serving base station.

According to a fourth embodiment of CSI feedback information transmission, like the second embodiment of the present invention, a user equipment may report channel matrix H and/or channel covariance matrix R and M noise plus interference variance values for M best subbands to a serving base station. In addition to this, the user equipment may transmit H and/or R value for a wideband. In particular, the user equipment may report $H(1)$, $H(2)$, ..., $H(M)$ and/or $R(1)$, $R(2)$, ..., $R(M)$, $H_w$ and/or $R_w$, and $\sigma^2(1)$, $\sigma^2(2)$, ..., $\sigma^2(M)$ values to the serving base station.

According to a fifth embodiment of CSI feedback information transmission, a user equipment may report H and/or R value and noise plus interference variance value for a wideband to a serving base station. In particular, the user equipment may report $H_w$ and/or $R_w$, and $\sigma_w^2$ value to the serving base station.

According to a sixth embodiment of CSI feedback information transmission, a user equipment may report a wideband H and/or R value for the wideband and M noise plus interference variance values corresponding to M best subbands to a serving base station. In case of using fractional frequency reuse (hereinafter abbreviated FFR) scheme, the user equipment may have a different interference level per subband. In this case, the user equipment may report a noise plus interference value corresponding to each of the M best subbands which are currently used to the serving base station. In particular, the user equipment may report $H_w$ and/or $R_w$, and $\sigma^2(1)$, $\sigma^2(2)$, ..., $\sigma^2(M)$ values to the serving base station.

According to a seventh embodiment of CSI feedback information transmission, a user equipment may report an average channel matrix and/or average covariance matrix for M best subbands and noise plus interference variance value for a whole bandwidth to a serving base station. In particular, the user equipment may report $H_{ave}$ and/or $R_{ave}$ and $\sigma_w^2$ value to the serving base station.

According to an eighth embodiment of CSI feedback information transmission, like the seventh embodiment of the present invention, a user equipment may report an average channel matrix and/or average covariance matrix for M best subbands to a serving base station. And, the user equipment may report noise plus interference variance value for a whole bandwidth to the serving base station in addition. In particular, the user equipment may report $H_{ave}$ and/or $R_{ave}$ and $\sigma^2(1)$, $\sigma^2(2), \ldots, \sigma^2(M)$ values to the serving base station.

According to a ninth embodiment of CSI feedback information transmission, like the seventh embodiment of the present invention, a user equipment may report an average channel matrix and/or average covariance matrix for M best subbands to a serving base station. And, the user equipment may additionally report noise plus interference variance value for a whole bandwidth to the serving base station. In addition to this, the user equipment may transmit a wideband H and/or R value for a wideband. In particular, the user equipment is able to report $H_{ave}$ and/or $R_{ave}$, $H_w$ and/or $R_w$, and $\sigma_w^2$ value to the serving base station.

According to a tenth embodiment of CSI feedback information transmission, like the seventh embodiment of the present invention, a user equipment may report an average channel matrix and/or average covariance matrix of M best subbands to a serving base station. And, the user equipment may additionally report M noise plus interference variance values to the serving base station. In addition to this, the user equipment may transmit a wideband H and/or R value for a wideband. In particular, the user equipment may report $H_{ave}$ and/or $R_{ave}$, $H_w$ and/or $R_w$, and $\sigma^2(1), \sigma^2(2), \ldots, \sigma^2(M)$ values to the serving base station.

According to an eleventh embodiment of CSI feedback information transmission, a user equipment may report channel matrix H and/or covariance matrix R for all available subbands and noise plus interference variance value for the whole bandwidth to a serving base station. For instance, assume that the specific number (M) subbands among N available subbands are allocated to the user equipment to use. If M=3, the user equipment may report matrix H and/or covariance matrix R for the whole N subbands to the serving base station instead of reporting matrix H and/or covariance matrix R for the M subbands. In particular, the user equipment may transmit $H(1), H(2), \ldots, H(N)$ and/or $R(1), R(2), \ldots, R(N)$, and $\sigma_w^2$ value to the serving base station.

According to a twelfth embodiment of CSI feedback information transmission, a user equipment may report channel matrix H and/or covariance matrix R and M noise plus interference variance values for all available subbands to a serving base station. In particular, the user equipment may transmit $H(1), H(2), \ldots, H(N)$ and/or $R(1), R(2), \ldots, R(N)$, and $\sigma^2(1), \sigma^2(2), \ldots, \sigma^2(M)$ values to the serving base station.

As mentioned in the above description of the first to twelfth embodiments of the CSI feedback information transmission, a serving base station is able to receive CSI feedback information transmitted in various forms by a user equipment. The serving base station is then able to determine a rank, precoding matrix (or vector), MCS (modulation and coding scheme) and the like for the user equipment based on the received CSI feedback information. The serving base station is able to support various transmission modes using the information determined in the above manner.

When a user equipment transmits CSI feedback information, in order to transmit CSI information more accurately and efficiently, the user equipment normalizes the CSI and then transmits the normalized CSI to the serving base station. This normalizing method can vary according to a type of the CSI feedback information transmitted by the user equipment.

In the following description, examined is a case that a user equipment feeds back a quantized channel matrix H to a serving base station. In this case, a channel matrix and a noise plus interference variance can be normalized using a maximum component value of the corresponding channel matrix. This user equipment is able to perform a normalizing procedure prior to quantizing the matrix H. For instance, matrix H for M best subbands and noise plus interference variance for M best subbands are considered. Assuming M=3, each channel matrix and noise plus interference variance may be normalized as follows.

$$\hat{H}(1) = \frac{H(1)}{\eta},$$ [Formula 1]

$$\hat{H}(2) = \frac{H(2)}{\eta},$$

$$\hat{H}(3) = \frac{H(3)}{\eta},$$

$$\hat{\sigma}^2(1) = \frac{\sigma^2(1)}{\eta^2},$$

$$\hat{\sigma}^2(2) = \frac{\sigma^2(2)}{\eta^2},$$

$$\hat{\sigma}^2(3) = \frac{\sigma^2(3)}{\eta^2}$$

In Formula 1, $\eta = \max |H_{ij}(k)|$, $i=1, 2, \ldots$ (i=row index), and $j=1, 2, \ldots$, (j=column index).

Based on feedback information of the quantized channel matrix H normalized by Formula 1, the serving base station is able to derive $$H(m) = \hat{H}(m) \times \eta,$$

$$\sigma^2(m) = \hat{\sigma}^2(m) \times \eta^2$$

and is able to calculate channel capacity of m best subbands (m=1, 2, ... M). Based on these informations, the serving base station is able to find a rank, a precoding matrix (or vector), an MCS and the like. The channel capacity of the m best subbands may be represented as Formula 2.

$$C(m) = \logdet\left(I + \frac{1}{\sigma^2(m)} H^H(m)H(m)\right)$$ [Formula 2]

$$= \logdet\left(I + \frac{1}{\hat{\sigma}^2(m) \times \eta^2} \eta^2 \times \hat{H}^H(m)\hat{H}(m)\right)$$

$$= \logdet\left(I + \frac{1}{\hat{\sigma}^2(m)} \hat{H}^H(m)\hat{H}(m)\right)$$

In Formula 2, the 'C(m)' means channel capacity for m subbands. The 'det' indicates a determinant function and means noise plus interference variance values on m subbands.

Moreover, the user equipment is able to normalize the matrix H and/or covariance matrix R by Formula 3.

$$\hat{H}(1) = \frac{H(1)}{\eta(1)},$$ [Formula 3]

$$\hat{H}(2) = \frac{H(2)}{\eta(2)},$$

$$\hat{H}(3) = \frac{H(3)}{\eta(3)},$$

$$\hat{\sigma}^2(1) = \frac{\sigma^2(1)}{\eta^2(1)},$$

$$\hat{\sigma}^2(2) = \frac{\sigma^2(2)}{\eta^2(2)},$$

$$\hat{\sigma}^2(3) = \frac{\sigma^2(3)}{\eta^2(3)}$$

In Formula 3, $\eta(m) = \max |H_{ij}(m)|$, $i=1, 2, \ldots$ (i=row index), and $j=1, 2, \ldots$ (j=column index).

In this case, the serving base station can be aware of $$H(m) = \hat{H}(m) \times \eta(m),$$
$$\sigma^2(m) = \hat{\sigma}^2(m) \times \eta^2(m)$$

from Formula 3 and is able to calculate channel capacity of each of the m best subbands ($m=1, 2, \ldots, M$) by Formula 4.

$$C(m) = \log\det\left(I + \frac{1}{\sigma^2(m)} H^H(m) H(m)\right)$$ [Formula 4]

$$= \log\det\left(I + \frac{1}{\hat{\sigma}^2(m) \times \eta^2(m)} \eta^2(m) \times \hat{H}^H(m)\hat{H}(m)\right)$$

$$= \log\det\left(I + \frac{1}{\hat{\sigma}^2(m)} \hat{H}^H(m)\hat{H}(m)\right)$$

In Formula 4, the 'C(m)' means channel capacity for m subbands. The 'det' indicates a determinant function and means noise plus interference variance values on m subbands.

H for M best subbands and noise plus interference variance for wideband may be normalized according to Formula 5.

$$\hat{H}(1) = \frac{H(1)}{\eta},$$ [Formula 5]

$$\hat{H}(2) = \frac{H(2)}{\eta},$$

$$\hat{H}(3) = \frac{H(3)}{\eta},$$

$$\hat{\sigma}_w^2 = \frac{\sigma_w^2}{\eta^2},$$

In Formula 5, $\eta = \max |H_{ij}(k)|$, $i=1, 2$, (i=row index), and $j=1, 2$, (j=column index). In this case, the serving base station can be aware of $$H(m) = \hat{H}(m) \times \eta,$$
$$\sigma_w^2 = \hat{\sigma}_w^2 \times \eta^2,$$

from Formula 5 and is able to calculate channel capacity of m best subbands according to Formula 6.

$$C(m) = \log\det\left(I + \frac{1}{\sigma_w^2} H^H(m) H(m)\right)$$ [Formula 6]

$$= \log\det\left(I + \frac{1}{\hat{\sigma}_w^2 \times \eta^2} \eta^2 \times \hat{H}^H(m)\hat{H}(m)\right)$$

$$= \log\det\left(I + \frac{1}{\hat{\sigma}_w^2} \hat{H}^H(m)\hat{H}(m)\right)$$

In Formula 4, the 'C(m)' means channel capacity for m subbands. The det indicates a determinant function and means noise plus interference variance values on m subbands.

The above-normalized CSI value may be fed back to the serving base station through quantization, compression, coding and modulation. By normalizing the channel matrix and the noise variance though a maximum component value of the corresponding channel matrix, a channel value may be mapped within a specific boundary in quantization.

In the following description, explained is a case that a user equipment feeds back a quantized covariance matrix R to a serving base station. In order to feed back the quantized covariance matrix R, it is able to normalize the matrix R and a noise plus interference variance through a maximum component value of the corresponding matrix R. This normalization procedure can be performed prior to quantization. The following is an example for a case of covariance matrix R of M best subbands and noise plus interference variance of M best subbands. Assuming M=3, each matrix R and noise plus interference variance may be normalized into Formula 7.

$$\hat{R}(1) = \frac{H(1)}{\mu}, \hat{R}(2) = \frac{H(2)}{\mu}, \hat{R}(3) = \frac{H(3)}{\mu},$$ [Formula 7]

$$\hat{\sigma}^2(1) = \frac{\sigma^2(1)}{\mu}, \hat{\sigma}^2(2) = \frac{\sigma^2(2)}{\mu}, \hat{\sigma}^2(3) = \frac{\sigma^2(3)}{\mu}$$

In Formula 7, $\mu = \max |R_{ij}(k)|$, $i=1, 2, \ldots$ (i=row index), and $j=1, 2, \ldots$ (j=column index).

Based on the quantized covariance matrix R feedback information normalized into Formula 7, the serving base station is able to calculate channel capacity of m best subbands ($m=1, 2, \ldots, M$) as follows. Moreover, the serving base station is able to find a rank, a precoding matrix (or vector), an MCS and the like based on these informations.

The serving base station can be aware of $$R(m) = \hat{R}(m) \times \mu,$$
$$\sigma^2(m) = \hat{\sigma}^2(m) \times \mu$$

and is able to find channel capacity according to Formula 8.

$$C(m) = \log\det\left(I + \frac{1}{\sigma^2(m)}R(m)\right)$$
$$= \log\det\left(I + \frac{1}{\hat{\sigma}^2(m)\times\mu}\mu\times\hat{R}(m)\right)$$
$$= \log\det\left(I + \frac{1}{\hat{\sigma}^2(m)}\hat{R}(m)\right)$$

[Formula 8]

In Formula 8, the 'C(m)' means channel capacity for m subbands. The 'det' indicates a determinant function and means noise plus interference variance values on m subbands.

Moreover, the user equipment is also able to normalize the matrix R and the like per best subband according to Formula 9.

$$\hat{R}(1) = \frac{R(1)}{\mu(1)}, \hat{R}(2) = \frac{R(2)}{\mu(2)}, \hat{R}(3) = \frac{R(3)}{\mu(3)},$$
$$\hat{\sigma}^2(1) = \frac{\sigma^2(1)}{\mu(1)}, \hat{\sigma}^2(2) = \frac{\sigma^2(2)}{\mu(2)}, \hat{\sigma}^2(3) = \frac{\sigma^2(3)}{\mu(3)}$$

[Formula 9]

In Formula 9, $\eta(m) = \max |R_{ij}(m)|$, $i=1, 2, \ldots$ (i=row index), and $j=1, 2, \ldots$ (j=column index).

In this case, the serving base station is able to calculate the channel capacity of each of the m best subbands (m=1, 2, ..., M) by Formula 10. The serving base station can be aware of $$R(m) = \hat{R}(m)\times\mu(m),$$
$$\sigma^2(m) = \hat{\sigma}^2(m)\times\mu(m)$$

and is able to find channel capacity according to Formula 10.

$$C(m) = \log\det\left(I + \frac{1}{\sigma^2(m)}R(m)\right)$$
$$= \log\det\left(I + \frac{1}{\hat{\sigma}^2(m)\times\mu(m)}\mu(m)\times\hat{R}(m)\right)$$
$$= \log\det\left(I + \frac{1}{\hat{\sigma}^2(m)}\hat{R}(m)\right)$$

[Formula 10]

In Formula 10, the 'C(m)' means channel capacity for m subbands. The 'det' indicates a determinant function and means noise plus interference variance values on m subbands.

Matrix R for M best subbands and wideband noise plus interference variance for the wideband may be normalized as Formula 11.

$$\hat{R}(1) = \frac{R(1)}{\mu}, \hat{R}(2) = \frac{R(2)}{\mu}, \hat{R}(3) = \frac{R(3)}{\mu},$$
$$\hat{\sigma}_w^2 = \frac{\sigma_w^2}{\mu},$$

[Formula 11]

In Formula 11, $\mu = \max |R_{ij}(k)|$, $i=1, 2, \ldots$ (i=row index), and $j=1, 2, \ldots$ (j=column index).

A formula such as $$R(m) = \hat{R}(m)\times\mu,$$
$$\sigma_w^2 = \hat{\sigma}_w^2\times\mu,$$

can be derived from Formula 11. The serving base station can find the channel capacity of each of the m best subbands as represented by Formula 12.

$$C(m) = \log\det\left(I + \frac{1}{\sigma_w^2}R(m)\right)$$
$$= \log\det\left(I + \frac{1}{\hat{\sigma}_w^2\times\mu}\mu\times\hat{R}(m)\right)$$
$$= \log\det\left(I + \frac{1}{\hat{\sigma}_w^2}\hat{R}(m)\right)$$

[Formula 12]

In Formula 12, the 'C(m)' means channel capacity for m subbands. The 'det' indicates a determinant function and means noise plus interference variance values on m subbands.

When the covariance matrix R is normalized, diagonal terms are paired as Formula 13 and the above-described procedure of normalizing the covariance matrix R can be then executed.

$$\mu = \max_{i=1,2,\ldots,N, j=1,2,\ldots,N}\{|R_{11} + jR_{22}|,$$
$$|R_{33} + jR_{44}|, \ldots, |R_{N-1,N-1} + jR_{NN}|, |R_{ij}|_{i\neq j}\}$$

[Formula 13]

For instance, in case of normalizing matrix R for 3 best subbands and noise plus interference variance for 3 best subbands, like Formula 13, diagonal terms of the matrix R are paired into a complex value and a maximum value is then found. Using the calculated maximum value, it is able to normalize off-diagonal terms, paired diagonal terms, and noise plus interference variance may be normalized. The user equipment is able to quantize the normalized values.

$$\mu(m) = \max_{i=1,2,\ldots,N, j=1,2,\ldots,N}\{|R_{11}(m) + jR_{22}(m)|,$$
$$|R_{33}(m) + jR_{44}(m)|, \ldots,$$
$$|R_{N-1,N-1}(m) + jR_{NN}(m)|, |R_{ij}(m)|_{i\neq j}\}$$

[Formula 14]

$$\overline{R_{11}(m) + jR_{22}(m)} = (R_{11}(m) + jR_{22}(m))/\mu(m)$$
$$\overline{R_{22}(m) + jR_{33}(m)} = (R_{33}(m) + jR_{44}(m))/\mu(m)$$
$$\vdots$$
$$\overline{R_{N-1,N-1}(m) + jR_{NN}(m)} = (R_{N-1,N-1}(m) + jR_{NN}(m))/\mu(m)$$
$$\hat{R}_{ij}(m) = R_{ij}(m)/\mu(m) \text{ for } i \neq j$$
$$\hat{\sigma}^2(m) = \sigma^2(m)/\mu(m)$$

In Formula 14, m=1, 2, and 3.

In the following description, explained is a case that a user equipment transmits analog CSI feedback information.

First of all, in case that a user equipment transmits analog CSI feedback information, the user equipment is able to normalize channel matrix H and noise variance value using a total power sum of all symbols corresponding to an uplink resource allocated to the corresponding user equipment. Namely, the η value of Formula 1 is the total power sum. Alternatively, after a matrix component has been loaded in an uplink resource allocated to the corresponding user equipment, normalization can be performed using a power sum of one symbol having a biggest power value. In this case, the η value of Formula 1 may be the power value of a specific symbol having the biggest power value.

Assume that a user equipment receives resource allocation for transmission of analog CSI feedback information in a manner that 1 resource block is allocated to PUSCH. Assume 4×2 MIMO system having 4 transmitting antennas of a base station and 2 receiving antennas of a user equipment. In order to meet the single carrier property, analog CSI feedback information may be mapped to the rest of symbols except mid symbol (e.g., $4^{th}$ symbol, $11^{th}$ symbol) of each slot including a reference symbol (RS) among 14 symbols. In particular, components of each channel may be mapped to a PUSCH (Physical Uplink Shared CHannel) region. A channel component mapped to each resource element may be normalized using a total power sum of the rest of all symbols except the symbols including the reference symbol. A different power may be provided to each symbol by a channel component. Therefore, when normalization is performed with each symbol power, each symbol has a different η value. To solve this problem, normalization may be performed with a power sum of all symbols.

In the following description, a resource grid structure used for LTE system is schematically explained.

Figure 3:
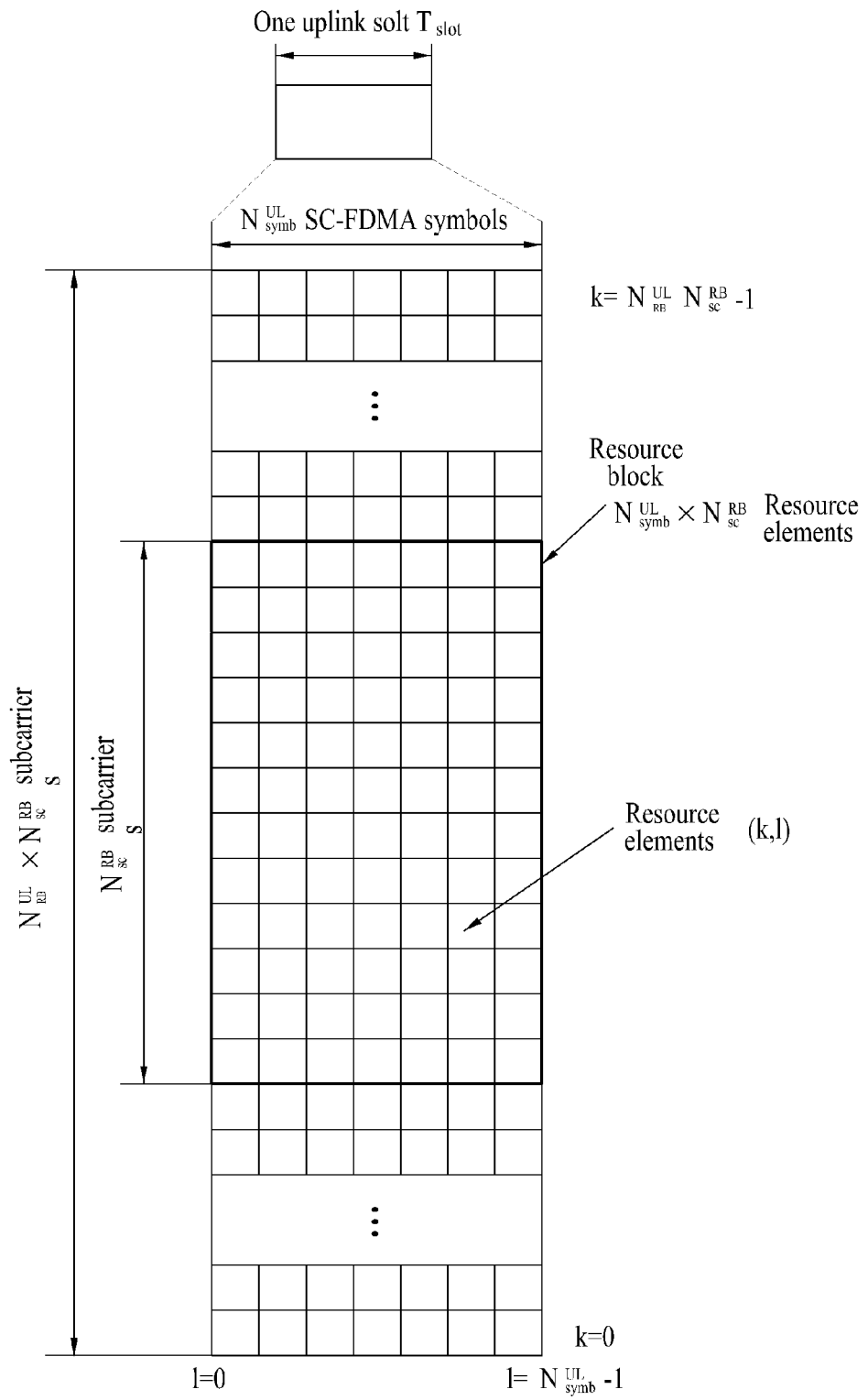
FIG. 3 is a diagram of an uplink time-frequency resource grid structure used for such a mobile communication system as 3GPP ($3^{rd}$ generation partnership project) LTE (long term evolution) system.

FIG. 3 is a diagram of an uplink time-frequency resource grid structure used for such a mobile communication system as 3GPP ($3^{rd}$ generation partnership project) LTE (long term evolution) system.

Referring to FIG. 3, an uplink signal transmitted in each slot can be depicted by such a resource grid, as shown in FIG. 3, constructed with $N_{RB}^{UL}N_{SC}^{RB}$ subcarriers and $N_{symb}^{UL}$ OFDM symbols. In this case, the $N_{RB}^{UL}$ indicates the number of resource blocks (RBs) in uplink, the $N_{SC}^{RB}$ indicates the number of subcarriers constructing one RB, and the $N_{symb}^{UL}$ indicates the number of OFDM symbols in one uplink slot. A size of the $N_{RB}^{UL}$ varies according to an uplink transmission bandwidth configured within a cell and should meet $N_{RB}^{min,UL} D N_{RB}^{UL} D N_{RB}^{max,UL}$. In this case, the $N_{RB}^{min,UL}$ indicates a smallest uplink bandwidth supported by a wireless communication system, and the $N_{RB}^{max,UL}$ indicates a biggest uplink bandwidth supported by the wireless communication system. It can be $N_{RB}^{min,UL}=6$ and $N_{RB}^{max,UL}=110$, by which the present invention is non-limited. The number of SC-FDMA symbols included within one slot can vary according to a length of a cyclic prefix (CP) and a subcarrier interval.

Each element within a resource grid is called a resource element (RE) and can be uniquely identified by an index pair (k, l) within a slot. In this case, the k indicates an index in frequency domain and the l indicates an index in time domain. The k is set to one of 0, . . . , and $N_{RB}^{UL}N_{SC}^{RB}-1$. The l is set to one of 0, . . . , and $N_{symb}^{UL}-1$.

Physical Resource Block (PRB) is defined as $N_{symb}^{UL}$ consecutive SC-FDMA symbols in time domain and $N_{SC}^{RB}$ consecutive subcarriers in frequency domain. In this case, the $N_{symb}^{UL}$ and the $N_{SC}^{RB}$ can be set to values determined in advance. For instance, the $N_{symb}^{UL}$ and the $N_{SC}^{RB}$ can be given as Table 2. Therefore, one PRB in uplink can be constructed with $N_{symb}^{UL}SN_{SC}^{RB}$ resource elements. Moreover, one PRB corresponds to one slot in time domain or to 180 kHz in frequency domain. The PRB number $n_{PRB}$ in frequency domain and the resource element index (k,l) in slot can meet the relation of $$n_{PRB} = \left\lfloor \frac{k}{N_{SC}^{RB}} \right\rfloor.$$

TABLE 1

| Configuration | $N_{SC}^{RB}$ | $N_{symb}^{UL}$ |
|---|---|---|
| Normal cyclic prefix | 12 | 7 |
| Extended cyclic prefix | 12 | 6 |

In the following description, explained is a method that a user equipment transmits a channel component by mapping the channel component to an allocated PUSCH based on the aforesaid resource structures used by the LTE system.

Figure 4:
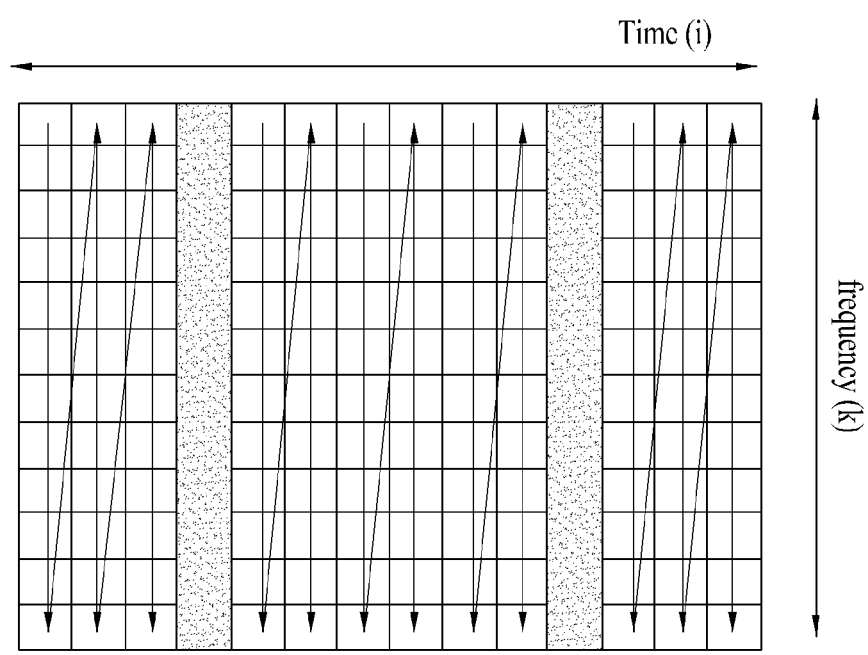
FIG. 4 is a diagram of an example for a method of mapping analog CSI feedback information according to the present invention.

FIG. 4 is a diagram of an example for a method of mapping analog CSI feedback information according to the present invention.

Referring to FIG. 4, CSI feedback information can be preferentially and consecutively mapped on a frequency axis. In doing so, the CSI feedback information can be mapped to the rest of symbols except mid-symbol (e.g., $4^{th}$ symbol, $11^{th}$ symbol) of each slot including a reference symbol (RS) among 14 symbols. For instance, the CSI feedback information is consecutively mapped on a frequency axis from a symbol (i=0) and may be consecutively mapped again on the frequency axis from a symbol (i=1). And, mapping may not be performed on the symbol (i=4 or i=11) including the reference symbol.

Figure 5:
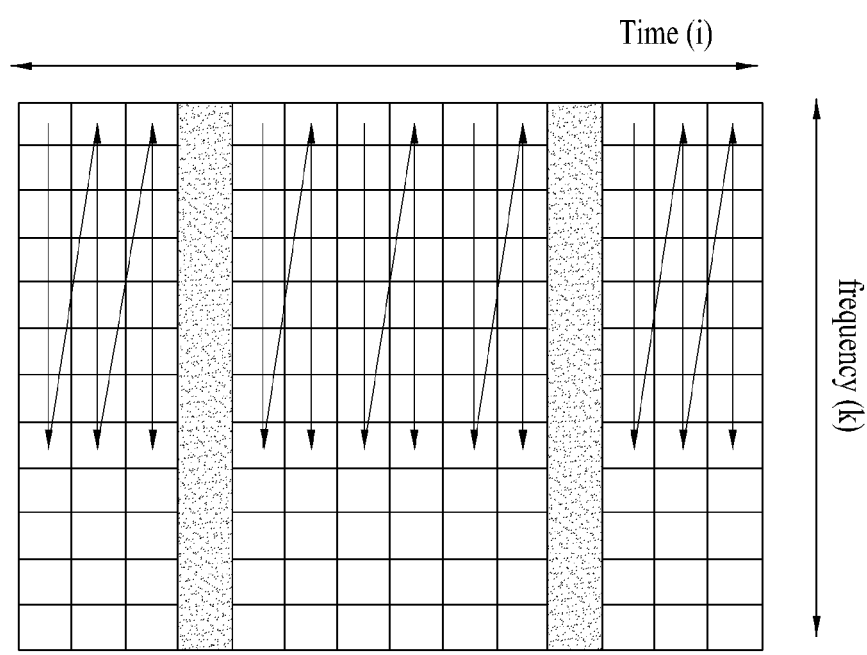
FIG. 5 is a diagram of an example for a method of mapping analog CSI feedback information according to the present invention.

FIG. 5 is a diagram of an example for a method of mapping analog CSI feedback information according to the present invention.

Referring to FIG. 5, one channel matrix may be mapped to each symbol. For instance, in 4×2 MIMO system, 8 channel components are mapped to one symbol and the rest of components may be nulled.

Figure 6:
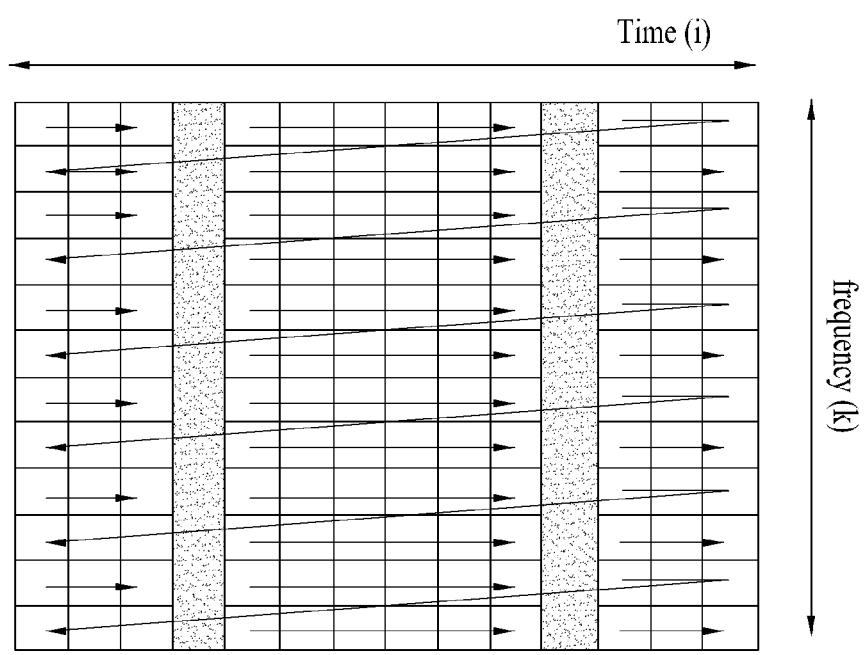
FIGS. 6 and 7 are diagrams of examples for a method of mapping analog CSI feedback information according to the present invention, respectively.
Figure 7:
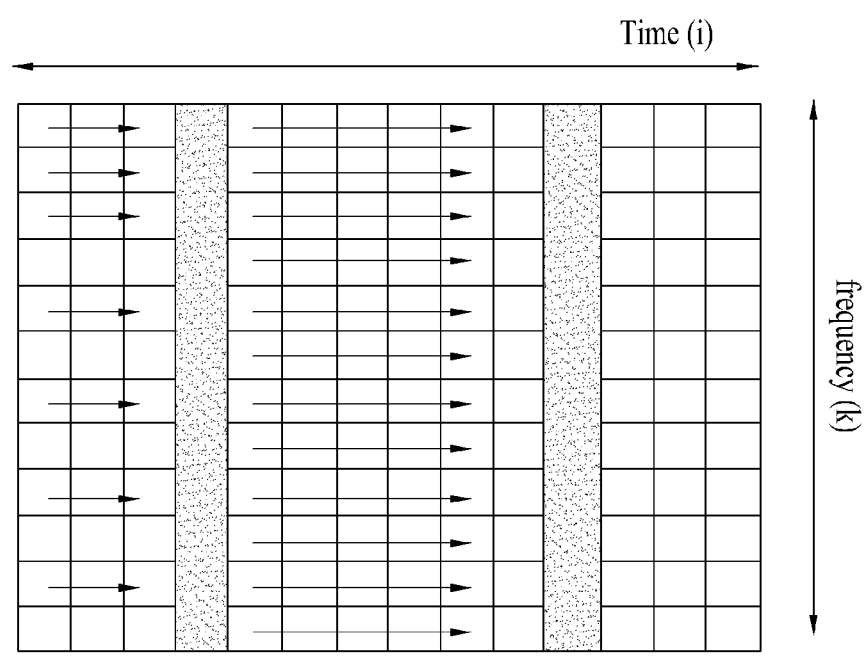

FIGS. 6 and 7 are diagrams of examples for a method of mapping analog CSI feedback information according to the present invention, respectively.

Referring to FIG. 6 and FIG. 7, CSI feedback information may be preferentially and consecutively mapped on a time axis. In doing so, the CSI feedback information may not be mapped to the mid-symbol (e.g., $4^{th}$ symbol, $11^{th}$ symbol) (symbol in slashed region) of each slot including a reference symbol (RS) among 14 symbols. Referring to FIG. 7, each of 8 channel components is mapped to one symbol and the rest can be nulled.

When a user equipment transmits analog CSI feedback information, a user equipment located on a cell boundary has difficulty in transmitting the feedback information accurately. In case of analog CSI feedback information transmission, a serving base station is able to acquire a more accurate channel value in a manner of time-averaging values of accumulated H and/or R as long as the H and/or R value does not vary. Since a noise variance value converges into 0 through averaging, it is possible to estimate a more accurate channel value. For this, a user equipment has to inform a serving base station of the variation of the H and/or R value. In particular, in case that a currently transmitted H and/or R value differs from previous values, a user equipment is able to transmit a new H and/or R indication (e.g., 1-bit size) to a serving base station. Having received this indication, the serving base station stops accumulating averaging the previous H and/or R values and is then able to perform accumulation and averaging of the new H and/or R value.

The above described contents can be extended as follows. First of all, channel matrix H or covariance matrix R is transmitted to each of a plurality of base stations performing CoMP operations, while noise plus interference variance for interference and noise attributed to the rest of the base station can be transmitted to the rest of the base stations. In doing so, before, a user equipment transmits matrix H or R and noise plus interference variance value to a base station, theses values can be normalized. In case of performing the normalization, it is able to use a biggest value among components of all channel matrixes or a biggest value among components of all covariance matrixes.

For instance, when 10 cells exist, assume that a user equipment reports channel matrix H or covariance matrix R for 2 best subbands (i.e., M=2) to a serving base station. Assume that the user equipment transmits channel matrix H and covariance matrix R for 2 neighbor cells (cell 1 and cell 2). And, assume that the user equipment transmits noise plus interference value to the rest of 7 cells (cells 3 to 10).

The covariance matrix R for 2 neighbor cells and the noise plus interference value can be normalized according to Formula 15.

$$\hat{R}_{cell1}(1) = \frac{R_{cell1}(1)}{\mu}, \hat{R}_{cell1}(2) = \frac{R_{cell1}(2)}{\mu},$$ [Formula 15]

$$\hat{R}_{cell2}(1) = \frac{R_{cell2}(1)}{\mu}, \hat{R}_{cell2}(2) = \frac{R_{cell2}(2)}{\mu}$$

$$\hat{\sigma}^2_{cell1}(1) = \frac{\hat{\sigma}^2_{cell1}(1)}{\mu}, \hat{\sigma}^2_{cell1}(2) = \frac{\hat{\sigma}^2_{cell1}(2)}{\mu},$$

$$\hat{\sigma}^2_{cell2}(1) = \frac{\hat{\sigma}^2_{cell2}(1)}{\mu}, \hat{\sigma}^2_{cell2}(1) = \frac{\hat{\sigma}^2_{cell2}(1)}{\mu}$$

In Formula 11, $\mu = \max |R_{i,j}^{Ncell}(k)|$, i=1, 2, . . . (i=row index), j=1, 2, . . . (j=column index), Ncell=1, 2, and k=1, 2.

The user equipment can transmit channel matrix H or covariance matrix R value for a best subband of the serving base station for a neighbor cell except a serving cell. Actually, the user equipment is able to transmit channel matrix H or covariance matrix R value for a specific subband on which the neighbor cell causes interference considerably. In doing so, a transmission periodicity may be equal to that of the channel matrix H or covariance matrix R value of the serving base station or can be set to a greater periodicity for long-term transmission.

Figure 8:
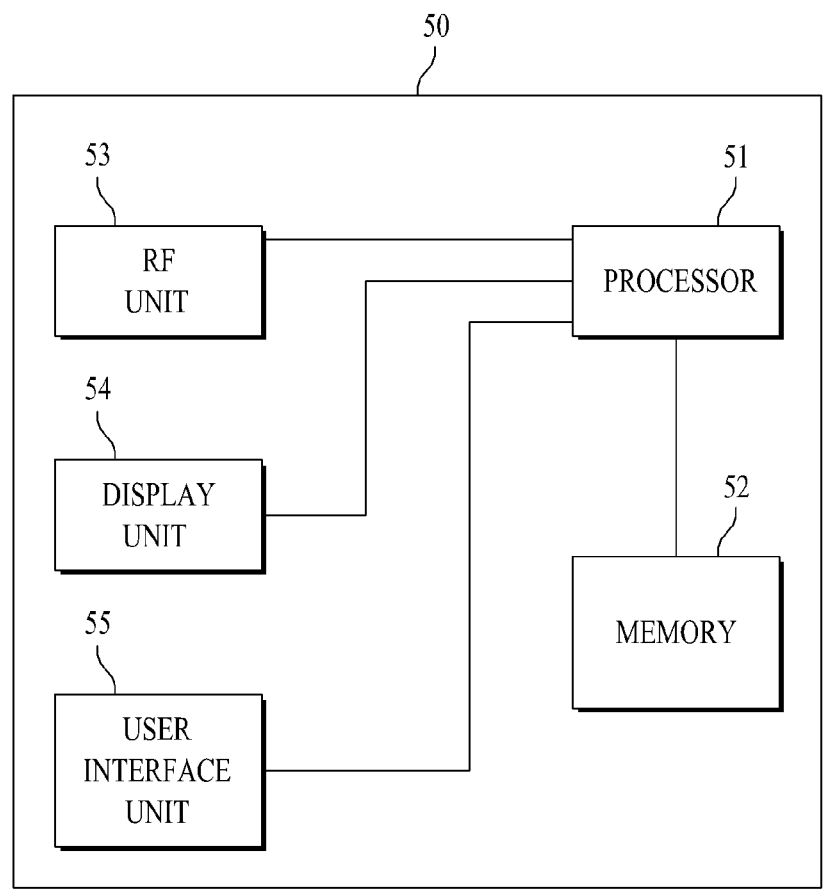
FIG. 8 is a block diagram showing constitutional elements of a device 50 that may be either the UE or the BS of FIG. 8.

FIG. 8 is a block diagram showing constitutional elements of a device 50 that may be either the UE or the BS of FIG. 8. Device 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If device is a UE, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals. The processor 51 may be configured to implement proposed procedures and/or method described in this application.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

The exemplary embodiments of the present invention may be achieved by various means, for example, hardware, firmware, software, or a combination thereof. In a hardware configuration, the methods according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for transmitting channel state information at a user equipment (UE) in a wireless communication system supporting a coordinated multi-point (CoMP) operation, the method comprising:

transmitting at least spatial channel matrix information or spatial channel covariance matrix information to each of a plurality of base stations which perform the CoMP operation among neighbor base stations; and transmitting noise plus interference variance information to at least one base station which does not perform the CoMP operation among the neighbor base stations, wherein:
the spatial channel matrix information includes spatial channel matrixes corresponding to each of a plurality of best subbands having best channel states;
the spatial channel covariance matrix information includes spatial channel covariance matrixes corresponding to each of the plurality of the best subbands; and
the noise plus interference variance information includes noise plus interference variance matrixes corresponding to each of a plurality of the best subbands.

2. The method of claim 1, wherein:
the spatial channel matrix information further includes a spatial channel matrix corresponding to a wideband; and
the spatial channel covariance matrix information further includes a spatial channel covariance matrix corresponding to a wideband.

3. The method of claim 1, wherein the spatial channel matrix information and the spatial channel covariance matrix information further include an average spatial channel matrix and an average spatial channel covariance matrix for the plurality of the best subbands, respectively.

4. The method of claim 1, wherein the spatial channel matrixes or the spatial channel covariance matrixes are normalized matrixes.

5. The method of claim 4, further comprising:
receiving an uplink resource allocated for transmission of the channel state information from a base station (BS), wherein the spatial channel matrixes or the spatial channel covariance matrixes are normalized using:
a total power value of total symbols corresponding to the uplink resource, or
a power value of a specific symbol having a biggest power among the total symbols 6. The method of claim 1, wherein the spatial channel matrix information or the spatial channel covariance matrix information is periodically transmitted.

7. The method of claim 1, wherein the noise plus interference variance information further includes a noise plus interference variance matrix corresponding to a wideband.

8. A user equipment (UE) for transmitting channel state information in a wireless communication system supporting a coordinated multi-point (CoMP) operation, the UE comprising:
a radio frequency (RF) unit; and
a processor configured to cause the RF unit to transmit at least:
spatial channel matrix information or spatial channel covariance matrix information to each of a plurality of base stations which perform the CoMP operation among neighbor base stations; and
noise plus interference variance information to at least one base station which does not perform the CoMP operation among the neighbor base stations,
wherein the spatial channel matrix information includes spatial channel matrixes corresponding to each of a plurality of best subbands having best channel states,
wherein the spatial channel covariance matrix information includes spatial channel covariance matrixes corresponding to each of the plurality of the best subbands, and
wherein the noise plus interference variance information includes noise plus interference variance matrixes corresponding to each of a plurality of the best subbands.

* * * * *